(12) United States Patent
Inaba et al.

(10) Patent No.: US 11,613,179 B2
(45) Date of Patent: Mar. 28, 2023

(54) POWER TRANSMISSION DEVICE

(71) Applicant: Kubota Corporation, Osaka (JP)

(72) Inventors: Daisuke Inaba, Sakai (JP); Ryota Kobayashi, Sakai (JP); Shunsuke Odashima, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/683,350

(22) Filed: Mar. 1, 2022

(65) Prior Publication Data
US 2022/0297535 A1 Sep. 22, 2022

(30) Foreign Application Priority Data

Mar. 17, 2021 (JP) .............. JP2021-043549

(51) Int. Cl.
*B60K 17/28* (2006.01)
*B60K 17/10* (2006.01)
*B60K 25/06* (2006.01)
*F16H 3/093* (2006.01)
*F16D 21/04* (2006.01)
(Continued)

(52) U.S. Cl.
CPC ............ *B60K 17/28* (2013.01); *B60K 17/105* (2013.01); *B60K 25/06* (2013.01); *F16D 21/04* (2013.01); *F16H 3/093* (2013.01); *B60Y 2200/221* (2013.01)

(58) Field of Classification Search
CPC ........ B60K 17/02; B60K 17/28; B60K 17/04; B60K 17/10; B60K 17/105; B60K 25/06; F16H 3/093; F16H 63/3026; F16H 47/00; F16H 47/02; B60Y 2200/221; F16D 21/02; F16D 21/04
See application file for complete search history.

(56) References Cited

U.S. PATENT DOCUMENTS 4,785,682 A * 11/1988 Nishimura .......... F16H 61/0274
74/359
10,005,357 B2 * 6/2018 Hashimoto .......... B60K 17/165
(Continued)

FOREIGN PATENT DOCUMENTS

JP 2002127771 A * 5/2002 ............ B60K 17/02
JP 2009-270683 11/2009
(Continued)

*Primary Examiner* — James A English
*Assistant Examiner* — Daniel M. Keck
(74) *Attorney, Agent, or Firm* — Mori & Ward, LLP

(57) ABSTRACT

A power transmission device includes a first shaft provided to be rotatable around a first rotational axis of the hydraulic pump driven by the engine. A second shaft is rotatable about the first rotational axis to rotate the power take shaft. A clutch is rotatable about a second rotational axis that is substantially parallel to the first rotational axis and is vertically below the first rotational axis. The clutch has a first rotating portion and a second rotating portion arranged to face each other in the second rotational axis. A first rotating portion is connectable to and separable from the second rotating portion. The first rotation transmission mechanism is configured to transmit rotation of the first shaft to the first rotating portion. A second rotation transmission mechanism is configured to transmit rotation of the second rotating portion to the second shaft.

20 Claims, 11 Drawing Sheets

(51) Int. Cl.
*F16H 63/30* (2006.01)
*F16H 47/02* (2006.01)

(56) References Cited

U.S. PATENT DOCUMENTS

| | | | | |
|---|---|---|---|---|
| 2002/0033093 | A1* | 3/2002 | Nemoto | F16H 47/02 92/71 |
| 2003/0188909 | A1* | 10/2003 | Ohashi | B60K 25/00 180/300 |
| 2006/0243513 | A1* | 11/2006 | Tsuji | B60K 17/02 180/252 |
| 2008/0250885 | A1* | 10/2008 | Benassi | B60K 17/28 74/15.2 |
| 2015/0068824 | A1* | 3/2015 | Matsuura | B60K 17/105 180/53.4 |
| 2020/0391589 | A1* | 12/2020 | Azuma | B60K 17/02 |
| 2022/0290748 | A1* | 9/2022 | Gono | B60K 17/08 |

FOREIGN PATENT DOCUMENTS

| | | | | |
|---|---|---|---|---|
| JP | 2014-193671 | | 10/2014 | |
| JP | 2014-194241 | | 10/2014 | |
| JP | 2016078823 A * | 5/2016 | | B60K 17/06 |
| KR | 20150145041 A * | 12/2015 | | B60K 17/06 |
| WO | WO-2015183009 A1 * | 12/2015 | | B60K 17/06 |
| WO | WO-2020137439 A1 * | 7/2020 | | B60K 17/06 |

\* cited by examiner

POWER TRANSMISSION DEVICE

CROSS-REFERENCE TO RELATED APPLICATIONS

The present application claims priority under 35 U.S.C. § 119 to Japanese Patent Application No. 2021-043549, filed Mar. 17, 2021. The contents of this application are incorporated herein by reference in their entirety.

TECHNICAL FIELD

Field of the Invention

The present invention relates to a power transmission device.

Background Art

Japanese Patent Application Laid-Open No. 2009-270683 describes a power transmission device for a work vehicle including a clutch connected to a rotary shaft of a hydraulic pump connected to an output shaft of an engine. One end of the clutch is connected to a rotary shaft of the hydraulic pump, and the other end of the clutch is connected to a power takeoff (PTO) shaft. When the clutch is engaged, the driving force of the rotary shaft of the hydraulic pump is transmitted to the PTO shaft. This clutch is referred to as a PTO clutch.

SUMMARY OF THE INVENTION

Problems to be Solved by the Invention

To improve durability of a PTO clutch is required.

Means for Solving Problems

A power transmission device according to a first aspect of the present disclosure includes a first shaft, a second shaft, a clutch, a first rotation transmission mechanism, and a second rotation transmission mechanism. The first shaft is provided to be rotatable around a first rotational axis and connected to a hydraulic pump to be driven by the engine. The second shaft is rotatable about the first rotational axis and configured to rotate the power take shaft. The clutch is rotatable about a second rotational axis that is substantially parallel to the first rotational axis and is vertically below the first rotational axis. The clutch has a first rotating portion and a second rotating portion which are arranged to face each other in the second rotational axis. The first rotating portion is connectable to and separable from the second rotating portion. The first rotation transmission mechanism is configured to transmit rotation of the first shaft to the first rotating portion. The second rotation transmission mechanism is configured to transmit the rotation of the second rotating portion to the second shaft.

Effects of the Invention

In the configuration disclosed in the present application, for example, since the PTO clutch is easily immersed in the lubricating oil, the durability of the PTO clutch can be improved.

DETAILED DESCRIPTION OF THE INVENTION

Figure 1:
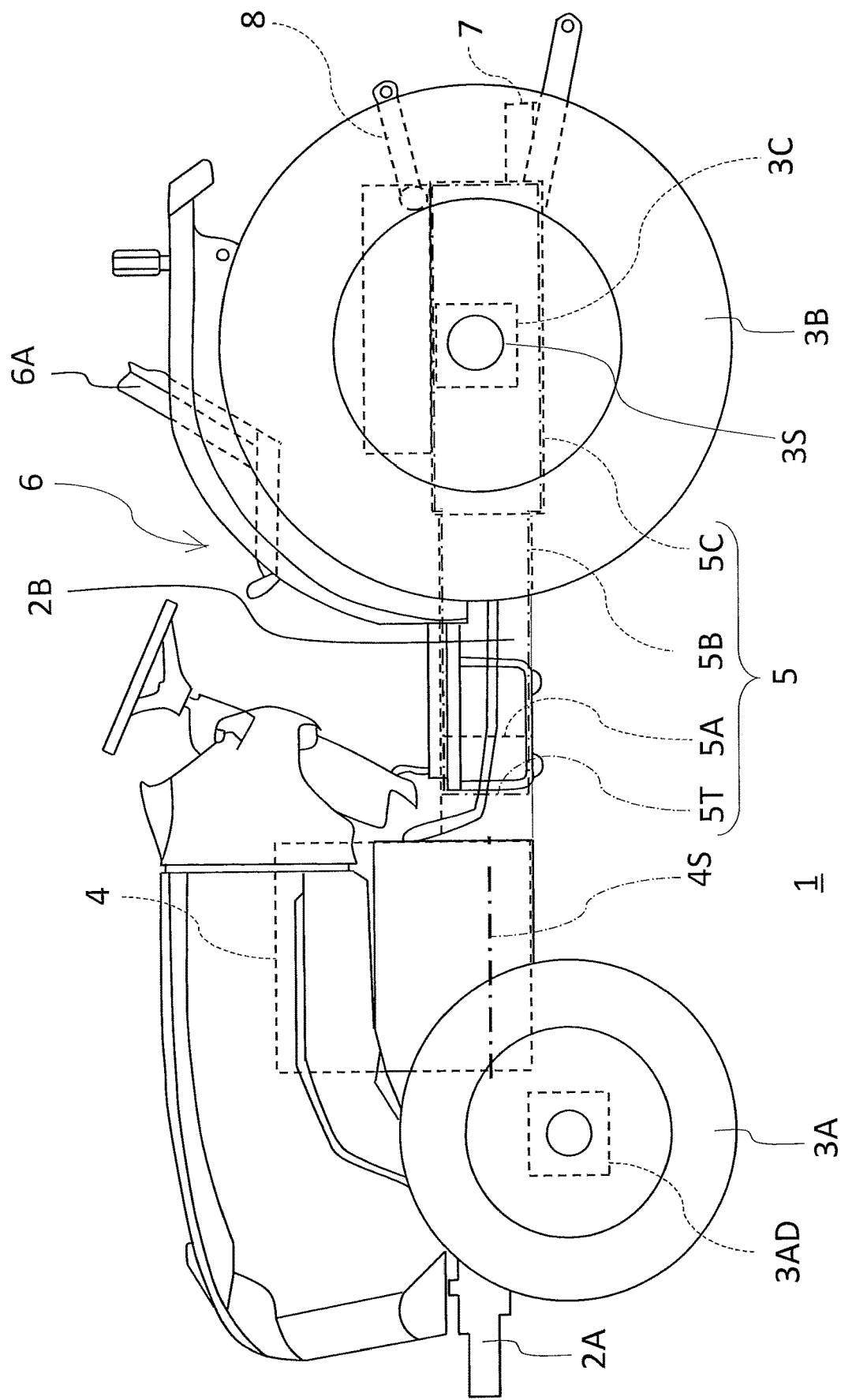
FIG. 1 is a side view of a work vehicle.

Hereinafter, the present invention will be described in detail with reference to the drawings showing embodiments thereof. In the drawings, the same reference numerals denote corresponding or substantially the same components.

Description of Embodiments

<Overall Configuration>

FIG. 1 is a side view of a tractor 1 as an example of a work vehicle. The tractor 1 includes a front frame 2A, a rear frame 2B, a front wheel 3A, a rear wheel 3B, an engine 4, a housing 5, a driver's compartment 6, a PTO shaft 7, and a lift arm 8. The front frame 2A supports the engine 4 and the front wheel 3A. The engine 4 includes a crankshaft 4S extending in the front-rear direction of the tractor 1. In FIG. 1, the rotational axis of the crankshaft 4S is indicated by the alternate long and short dash line. The rear frame 2B supports the rear wheel 3B to which the rear wheel 3S is connected, the rear wheel case 3C, and the driver's compartment 6. The housing 5 is attached to the 2B of the rear frame. The PTO shaft 7 and the lift arm 8 are attached with a working device such as a rotary tiller (not illustrated). The housing 5 includes a front case portion 5A, an intermediate case portion 5B, and a rear case portion 5C. Among them, a portion including the rear half region of the front case portion 5A capable of storing the lubricating oil, the intermediate case portion 5B, and the rear case portion 5C may be referred to as a transmission case 5T.

The front case portion 5A accommodates the input shaft 11 and the hydrostatic continuously variable transmission mechanism 16. The input shaft 11 and the hydrostatic continuously variable transmission mechanism 16 will be described later. The intermediate case portion 5B houses a power takeoff mechanism 20 to the PTO shaft 7 and a transmission mechanism 50 for switching the speed stage of the tractor 1. Details of the power takeoff mechanism 20 and the transmission mechanism 50 will be described later. The rear case portion 5C houses a differential gear 3BD that transmits the power after the speed change by the transmission mechanism 50 to the left and right rear wheel 3B, a gear unit 70 that extracts power for front wheel driving from the power after the speed change by the transmission mechanism 50, a lift cylinder (not shown) that drives the lift arm 8, the PTO shaft 7, and the like. A configuration including the input shaft 11, the power takeoff mechanism 20, the transmission mechanism 50, and the intermediate case portion 5B is referred to as a power transmission device 10.

In the embodiment according to the present application, the front-rear direction (forward direction/rearward direction) of the tractor 1 means the front-rear direction (forward direction/rearward direction) as viewed from an operator seated on the seat 6A of the driver's compartment 6. The left direction, the right direction, and the width direction of the tractor 1 mean the left direction, the right direction, and the left and right direction, respectively, when viewed from the operator. The upward direction, the downward direction, and the height direction of the tractor 1 mean the upward direction, the downward direction, and the height direction when viewed from the operator. The front-rear, left-right (width), and up-down (height) directions of the tractor 1 respectively correspond to the front-rear, left-right (width), and up-down (height) directions as viewed from the operator.

Figure 2:
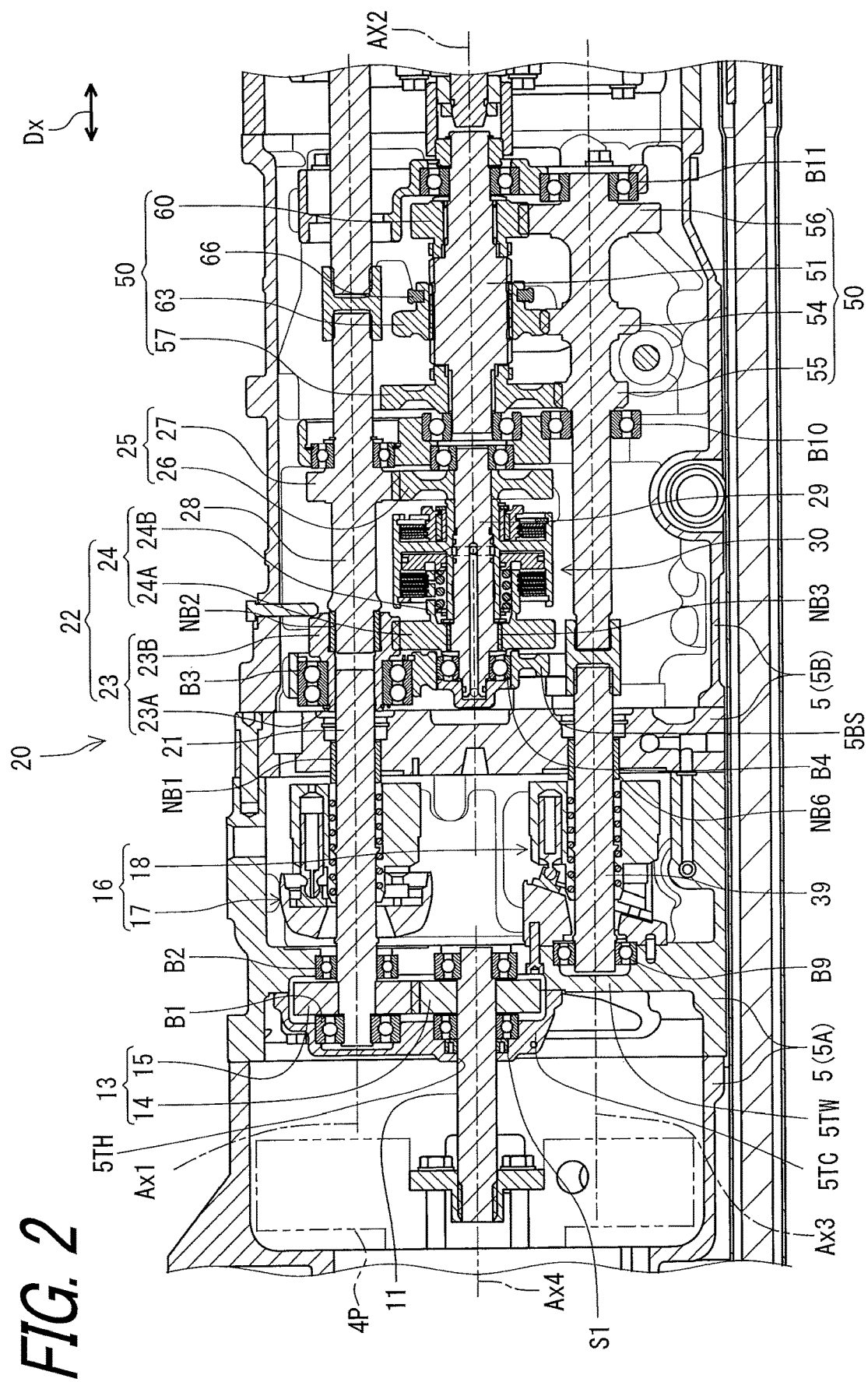
FIG. 2 is a sectional view of a front half portion of the housing.

FIG. 2 is a cross-sectional view of the housing 5 taken along a cutting plane passing through the input shaft 11 of the power transmission device 10 connected to the output part 4P of the engine 4 and extending in the vertical direction of the tractor 1. In particular, the output part 4P is a flywheel connected to the crankshaft 4S. The flywheel may be replaced with another power transmission mechanism disposed between the crankshaft 4S and the input shaft 11, such as a torque converter. In FIG. 2, components outside the housing 5 are not shown. In FIG. 2, the input shaft is connected to the crankshaft 4S such that the center axis of the input shaft 11 is coaxial with the rotational axis of the crankshaft 4S. Therefore, the input shaft 11 extends in the front-rear direction of the tractor 1. In the present embodiment, the center axis of the input shaft 11 is referred to as a fourth rotational axis Ax4. The fourth rotational axis Ax4 extends in the front-rear direction of the tractor 1. The input shaft 11 is rotatable about a fourth rotational axis Ax4. The driving force of the input shaft 11 is transmitted to the third rotation transmission mechanism 13. No clutch is provided between the engine 4 and the third rotation transmission mechanism 13.

The power transmission device 10 includes a third rotation transmission mechanism 13. The third rotation transmission mechanism 13 includes a transmission input gear 14 and a first shaft connection gear 15. The transmission input gear 14 is connected to the input shaft 11 and is rotatable about a fourth rotational axis Ax4. The power takeoff mechanism 20 includes a first shaft 21, a first rotation transmission mechanism 22, a clutch 30, a second rotation transmission mechanism 25, a second shaft 28, and a third shaft 29. The transmission case 5T accommodates the first shaft 21, the second shaft 28, the clutch 30, the first rotation transmission mechanism 22, and the second rotation transmission mechanism 25.

The first shaft 21 extends in the front-rear direction of the tractor 1. The first shaft 21 is rotatable about a first rotational axis Ax1. That is, the first rotational axis Ax1 extends in the front-rear direction of the tractor 1 and is substantially parallel to the fourth rotational axis Ax4. The first rotational axis Ax1 is located above the fourth rotational axis Ax4. Viewing from the vertical direction, the first rotational axis is disposed so as to substantially overlap the fourth rotational axis Ax4. However, the first rotational axis Ax1 may be slightly displaced from the fourth rotational axis Ax4 in the width direction of the tractor 1. The first shaft 21 is rotatably supported by a plurality of bearings B1 and B2 supported by the front case portion 5A and a needle bearing NB1 supported by the intermediate case portion 5B. The first shaft connection gear 15 is attached to one end of the first shaft 21. The first shaft connection gear 15 rotates about the first rotational axis Ax1 integrally with the first shaft 21. A first rotation transmission mechanism 22 is attached to the other end of the first shaft 21 opposite to the one end in the axial direction Dx along the first rotational axis Ax1.

The hydrostatic continuously variable transmission mechanism 16 includes a hydraulic pump 17 and a hydraulic motor 18. The hydrostatic continuously variable transmission mechanism 16 can change the gear ratio by changing the angle of the swash plate of the hydraulic pump 17. A hydraulic pump 17 is connected to an intermediate portion between the one end and the other end of the first shaft 21. The hydraulic pump 17 is configured to be rotated about the first rotational axis Ax1 by the first shaft 21. The hydraulic pump 17 is driven by the rotation of the engine 4, that is, the first shaft 21, and outputs pressure oil to the hydraulic motor 18 through an oil passage (not illustrated). The hydraulic motor 18 is thus driven by the hydraulic pump 17 to rotate the fourth shaft 39. Details of the fourth shaft 39 will be described later.

The first rotation transmission mechanism 22 includes a boss gear 23 and a boss gear 24. The boss gear 23 includes a boss portion 23A and a gear portion 23B. The boss portion 23A and the gear portion 23B are integrally formed. The boss portion 23A is connected to the first shaft 21 such that the boss gear 23 rotates integrally with the first shaft 21 about the first rotational axis Ax1. For example, the outer peripheral surface of the first shaft 21 may have a male spline, and the inner peripheral surface of the 23A of the boss portion may have a female spline engageable with the male spline. Alternatively, the boss portion 23A may be fixed to the first shaft 21 by a screw or the like. The outer peripheral surface of the boss portion 23A is connected to the bearings B3. The boss gear 23 is supported on the intermediate case portion 5B through the bearings B3. A helical gear is formed on an outer peripheral surface of a gear portion 23B, and a needle bearing NB2 is attached to an inner peripheral surface of the gear portion 23B.

Figure 3:
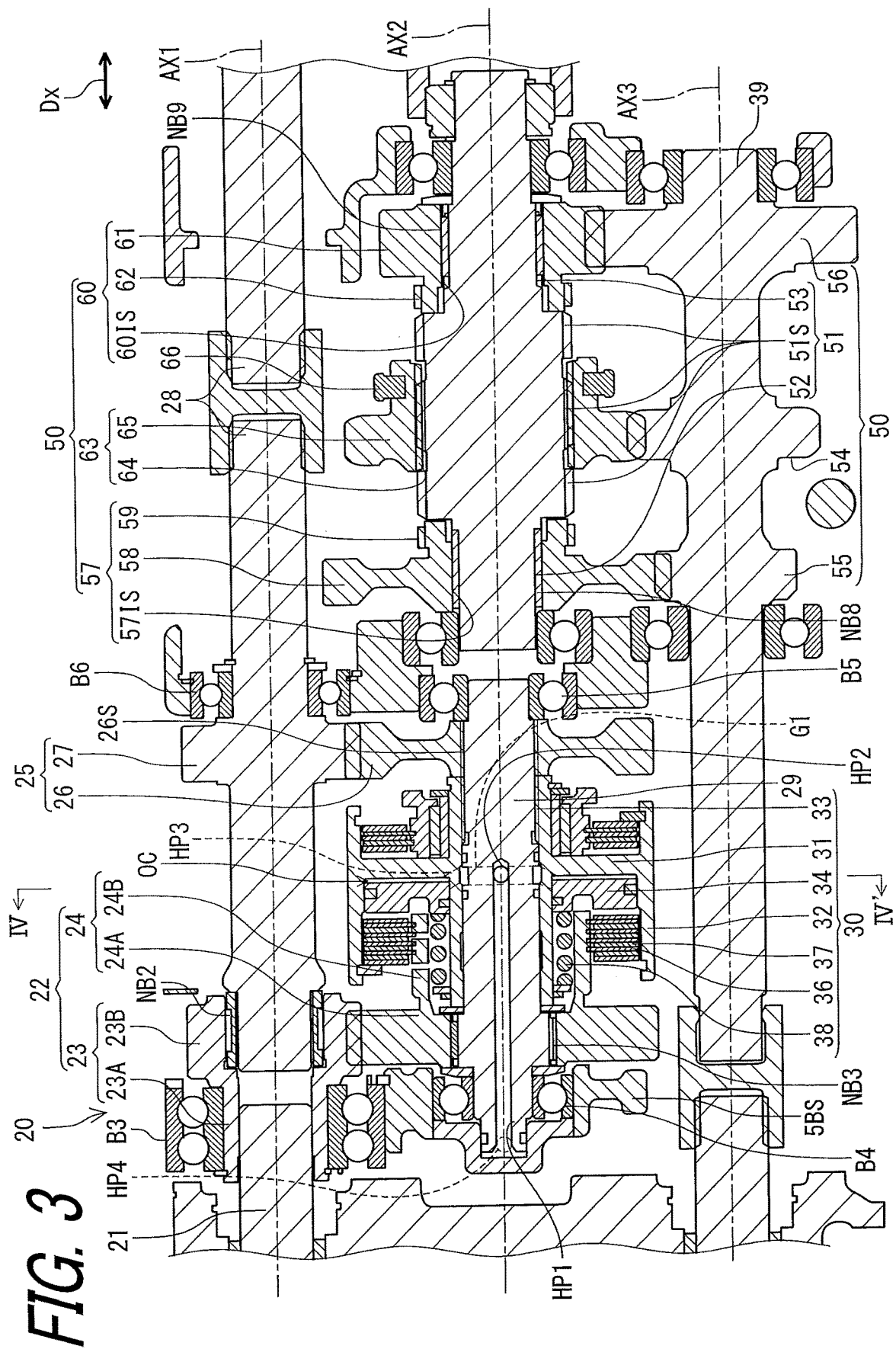
FIG. 3 is an enlarged view of the power takeoff mechanism and the transmission mechanism shown in FIG. 2.

FIG. 3 is an enlarged view of the power takeoff mechanism 20 and the transmission mechanism 50 shown in FIG. 2. Referring to FIGS. 2 and 3, the boss gear 24 includes a gear portion 24A and a boss portion 24B. The boss portion 24B and the gear portion 24A are integrally formed. A needle bearing NB3 is attached to an inner peripheral surface of the boss gear 24, and the boss gear 24 is rotatably supported with respect to the third shaft 29 via the needle bearing NB3. The gear portion 24A is connected to the gear portion 23B of the boss gear 23, and the clutch 30 is connected to the boss portion 24B. The clutch 30 is rotatably supported by the third shaft 29. The third shaft 29 extends along a second rotational axis line Ax2 that is substantially parallel to the first rotational axis line Ax1 and is provided vertically below the first rotational axis line Ax1. Therefore, the clutch 30 is rotatable about the second rotational axis Ax2. When viewed in the front-rear direction, the second rotational axis Ax2 is slightly shifted in the left-right direction from the first rotational axis Ax1 (see FIG. 4).

The clutch 30 is a hydraulic clutch. The clutch 30 includes a cylinder 31, a piston 34, a first rotating portion 36, a second rotating portion 37, and a spring 38. The first rotating portion 36 and the second rotating portion 37 are clutch disks that are face each other on the second rotational axis Ax2. The first rotating portion 36 can be connected to and separated from the second rotating portion 37. The first rotating portion 36 is engaged with the boss portion 24B of the boss gear 24. For example, the boss portion 24B has a male spline extending in the axial direction Dx, the first rotating portion 36 has a female spline engageable with the male spline, and the rotation of the boss portion 24B is transmitted to the first rotating portion 36 by the engagement between the male spline and the female spline. Therefore, the first rotation transmission mechanism 22 can transmit the rotation of the first shaft 21 to the first rotating portion 36. The spring 38 presses the piston 34 in the axial direction Dx such that the second rotating portion 37 is separated from the first rotating portion 36 in the axial direction Dx.

Figure 4:
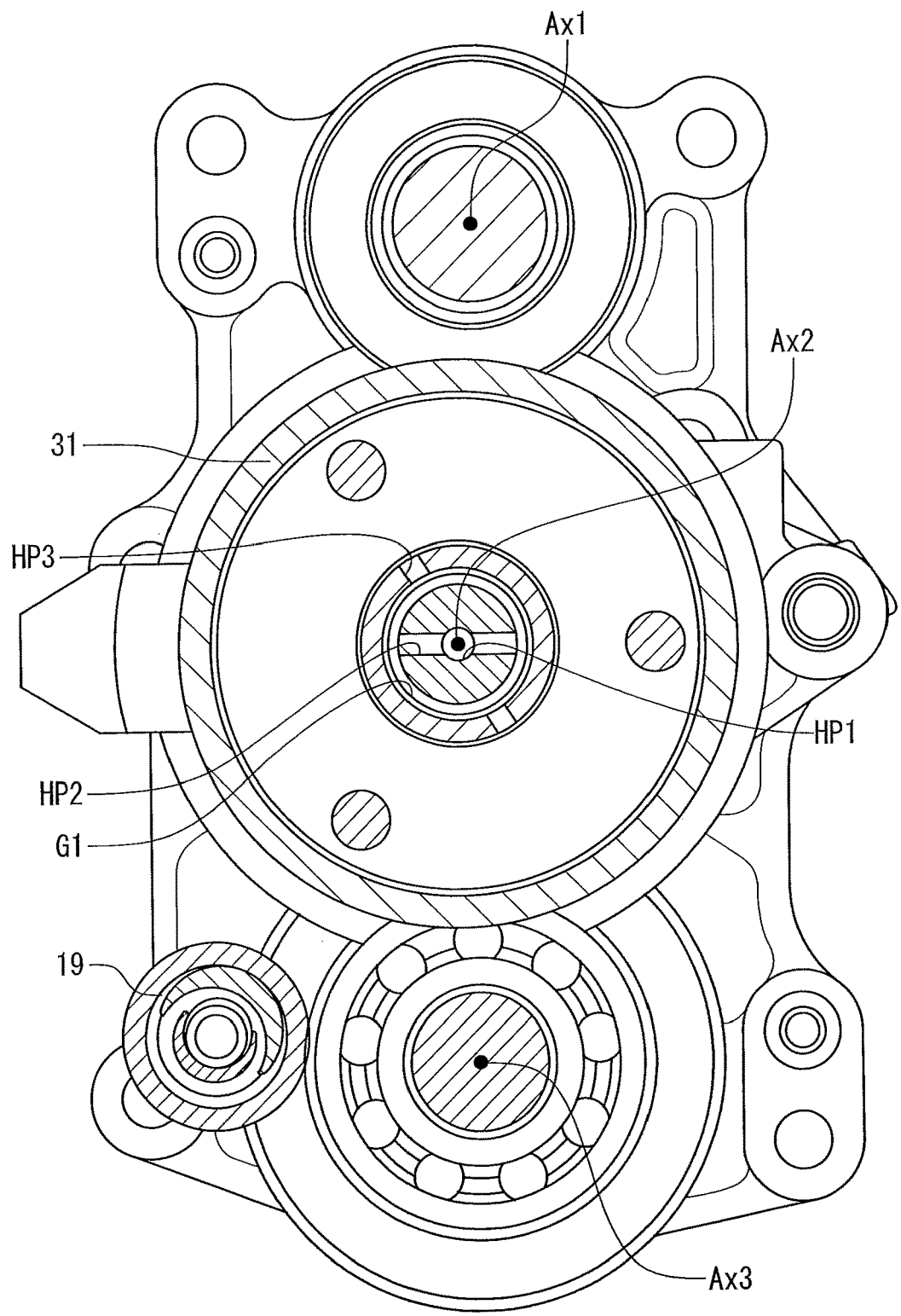
FIG. 4 is a cross-sectional view taken along line IV-IV' of FIG. 3.

The cylinder 31 and the piston 34 define an oil chamber OC. The third shaft 29 has oil passages HP1 and HP2 therein and a groove G1 on its outer periphery. The cylinder 31 has an oil passage HP3. FIG. 4 is a cross-sectional view taken along line IV-IV' of FIG. 3. Referring to FIG. 3, the oil passage HP1 extends in the axial direction Dx along the second rotational axis Ax2. The oil passage HP2 extends perpendicular to the second rotational axis Ax2, that is, in the radial direction. The oil passage HP3 also extends perpendicularly to the second rotational axis Ax2, that is, in the radial direction. The oil passage HP1 may be referred to as a first oil passage.

Figure 5:
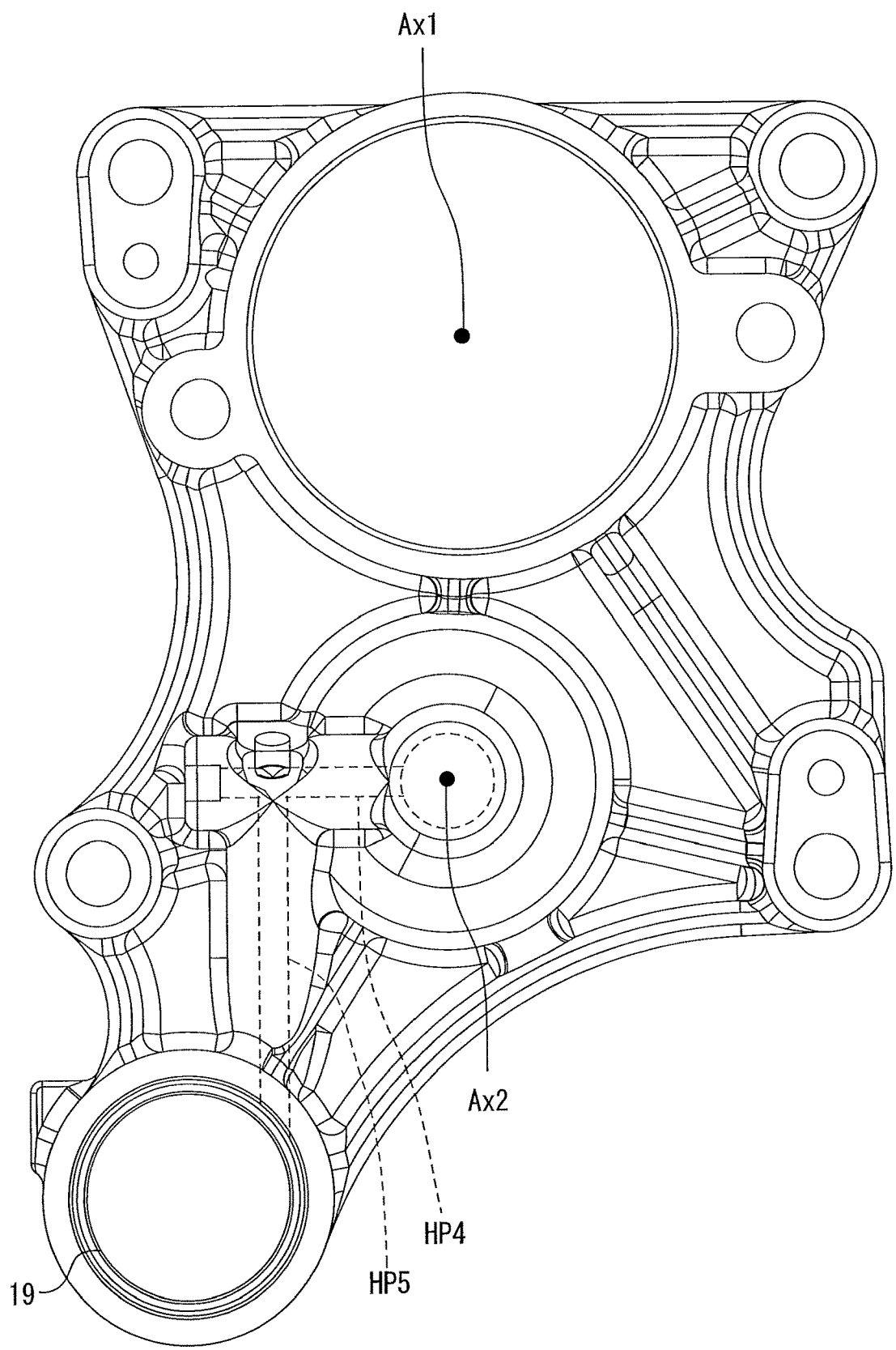
FIG. 5 is a front view of the support member.

Referring to FIGS. 2 and 3, the intermediate case portion 5B includes a support member 5BS that rotatably supports the third shaft 29. The third shaft 29 is supported by the support member 5BS via the bearings B4. Further, the third shaft 29 is supported by another portion of the intermediate case portion 5B via the bearings B5. FIG. 5 is a front view of the support member 5BS. Referring to FIGS. 4 and 5, the support member 5BS has oil passages HP4 and HP5 connectable to the oil passage HP1. The oil passage HP4 extends in the left-right direction, and the oil passage HP5 extends in the up-down direction. The oil passage HP5 is connected to a hydraulic oil control device 19 for supplying the operating oil to the oil chamber OC and discharging the operating oil from the oil chamber OC. Therefore, the working oil can be supplied to the oil chamber OC via the oil passages HP1 to HP5. The hydraulic oil control device 19 includes an accumulator and a switching valve. When the hydraulic oil is suppliable to the oil chamber OC, the switching valve connects the accumulator and the oil chamber OC. When the hydraulic oil is discharged from the oil chamber OC, the switching valve connects a discharge oil passage to the oil pan and the oil chamber OC. When the hydraulic oil is suppliable to the oil chamber OC, the piston 34 moves toward the second rotating portion 37 against the pressure of the spring 38 and presses the second rotating portion 37 against the first rotating portion 36.

Figure 6:
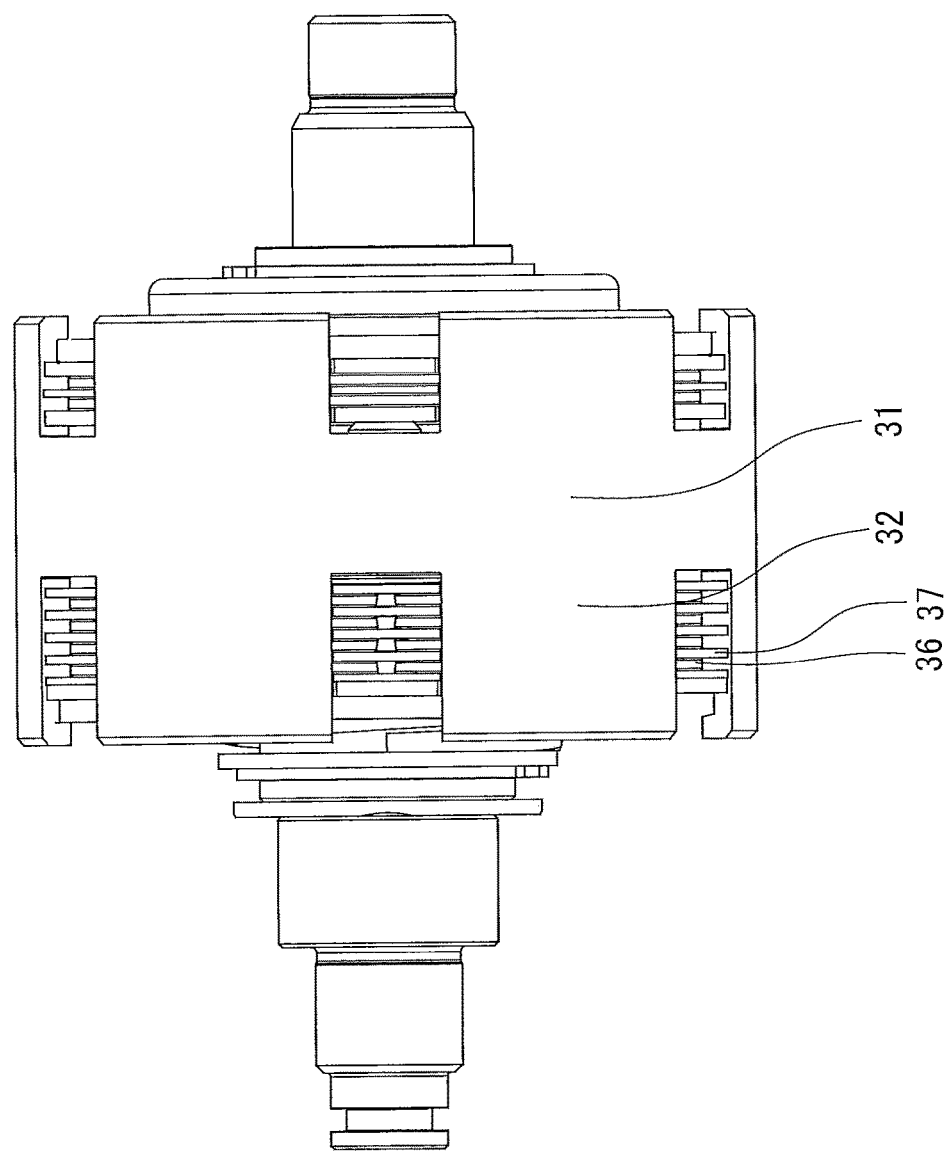
FIG. 6 is a view showing an outer shell of the clutch.

FIG. 6 is a view showing an outline of the clutch 30. The clutch 30 has an extending portion 32 extending from the outer periphery of the cylinder 31. The second rotating portion 37 has a convex portion that engages with the extending portion 32 on the outer periphery thereof. Further, as shown in FIG. 3, the clutch 30 further includes a spline 33 for engaging the third shaft 29. Therefore, when the second rotating portion 37 is pressed against the first rotating portion 36 by the piston 34, the rotation of the boss gear 24 is transmitted to the third shaft 29 via the first rotating portion 36, the second rotating portion 37, the extending portion 32, the cylinder 31, and the spline 33. Therefore, the boss gear 24 rotates integrally with the third shaft 29.

When the discharge oil passage to the oil pan is connected to the oil chamber OC, the piston 34 moves away from the first rotating portion 36 by the pressing force of the spring 38, and the second rotating portion 37 moves away from the first rotating portion 36. As a result, the rotation of the first rotating portion 36 is not transmitted to the second rotating portion 37. As described above, since the boss gear 24 is rotatably supported with respect to the third shaft 29 via the needle bearing NB3, the boss gear 24 rotates integrally with the third shaft 29.

The second rotation transmission mechanism 25 includes a gear 26 and a gear 27. The inner peripheral surface of the gear 26 includes a spline 26S that engages with the third shaft 29. Therefore, the gear 26 is rotatable about the second rotational axis Ax2 integrally with the third shaft 29. The gear 27 is formed integrally with the second shaft 28. Therefore, the gear 27 is rotatable integrally with the second shaft 28. Therefore, the rotation of the third shaft 29 is transmitted to the second shaft 28. The gear 27 may be separate from the second shaft 28. The second shaft 28 is supported by needle bearings NB2, bearings B6, B7 and B8. The bearings B6 is supported by the intermediate case portion 5B. The bearings B7 and B8 are supported by the rear case portion 5C (see FIG. 7). The second shaft 28 is arranged so as to be coaxial with the first shaft 21. Therefore, the second shaft 28 is rotatable about the first rotational axis Ax1. With the above configuration, the second rotation transmission mechanism 25 can transmit the rotation of the second rotating portion 37 to the second shaft 28.

Figure 7:
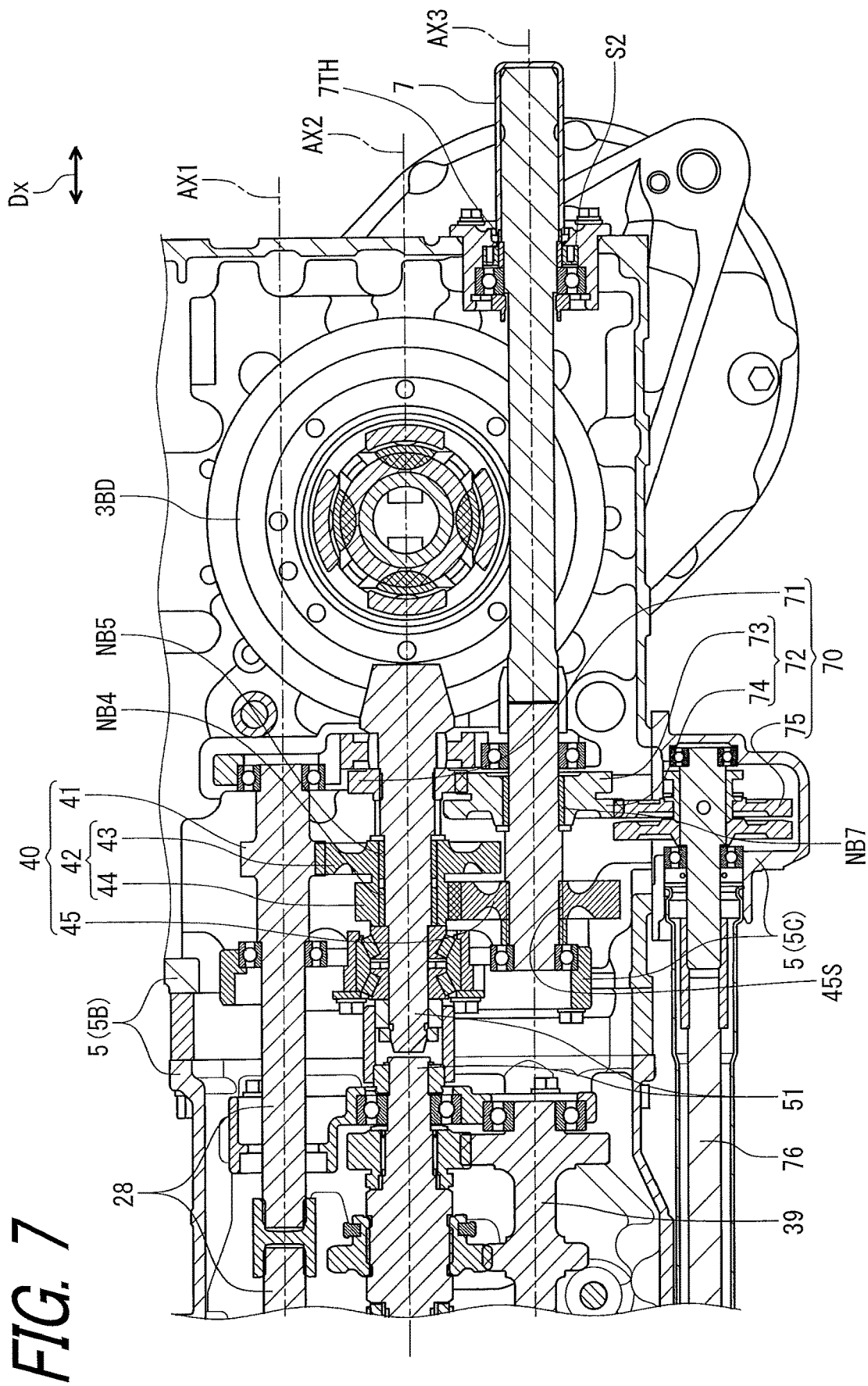
FIG. 7 is a cross-sectional view of a rear half portion of the housing.

FIG. 7 is a cross-sectional view of a rear half portion of the housing 5. As shown in FIG. 7, the second shaft 28 extends to the rear case portion 5C. The power takeoff mechanism 20 further includes a fourth rotation transmission mechanism 40. The second shaft 28 is connected to the PTO shaft 7 via a fourth rotation transmission mechanism 40. That is, the second shaft 28 is configured to rotate the PTO shaft 7. The fourth rotation transmission mechanism 40 includes a first PTO drive gear 41, a first gear assembly 42, and a second PTO drive gear 45. The first PTO drive gear 41 is provided on the second shaft 28. The first PTO drive gear 41 is rotatable together with the second shaft 28 and the first rotational axis Ax1. More particularly, the first PTO drive gear 41 is integrally formed with the second shaft 28. However, the first PTO drive gear 41 may be separate from the second shaft 28.

The first gear assembly 42 is supported by the fifth shaft 51 via needle bearings NB4 and NB5. The fifth shaft 51 is disposed so as to be coaxial with the third shaft 29. Therefore, the fifth shaft 51 is rotatable about the second rotational axis Ax2. Therefore, the first gear assembly 42 is supported by the fifth shaft 51 so as to be rotatable about the second rotational axis Ax2 with respect to the fifth shaft 51. Details of the fifth shaft 51 will be described later. The first gear assembly 42 includes a third gear portion 43 and a fourth gear portion 44. The third gear portion 43 engages with the first PTO drive gear 41 and is rotatable about the second rotational axis Ax2. The fourth gear portion 44 is rotatable about the second rotational axis Ax2 together with the third gear portion 43. The third gear portion 43 and the fourth gear portion 44 are integrally formed. The second PTO drive gear 45 has a spline 45S for engaging with the PTO shaft 7 on its inner peripheral surface. The second PTO drive gear 45 is supported by the PTO shaft 7 so as to be rotatable together with the PTO shaft 7, and is engaged with the fourth gear portion 44.

Next, the power transmission path of the traveling system that drives the front wheel 3A and the rear wheel 3B will be described. Referring to FIG. 2, the power transmission device 10 includes a hydrostatic continuously variable transmission mechanism 16, a fourth shaft 39, and a transmission mechanism 50. The fourth shaft 39 is configured to be rotated by the hydraulic motor 18. The fourth shaft 39 is supported by bearings B9, B10, B11 and needle bearings NB6. The bearing B9 is supported by the front case portion 5A. The bearings B10, B11 and the needle bearings NB6 are supported by the intermediate case portion 5B. The fourth shaft 39 is rotatable about a third rotational axis Ax3 substantially parallel to the first rotational axis Ax1. The third rotational axis Ax3 is provided vertically below the first rotational axis Ax1. As shown in FIG. 4, when viewed in the front-rear direction, the third rotational axis Ax3 is slightly shifted in the left-right direction from the first rotational axis Ax1. As shown in FIG. 7, the fourth shaft 39 and the PTO shaft 7 are rotatable about the third rotational axis Ax3. The fourth shaft 39 is spaced apart from the PTO shaft 7 along the third rotational axis Ax3.

Referring to FIGS. 2, 3, and 7, the transmission mechanism 50 includes a first middle gear 54, a first low gear 55, a first high gear 56, a fifth shaft 51, a first free gear 57, a second free gear 60, and a sliding gear 63. The first middle gear 54 is provided on the fourth shaft 39 and is rotatable together with the fourth shaft 39. The first low gear 55 is provided on the fourth shaft 39 and is rotatable together with the fourth shaft 39. The number of teeth of the first low gear 55 is smaller than the number of teeth of the first middle gear 54. The first high gear 56 is provided on the fourth shaft 39 and is rotatable together with the fourth shaft 39. The number of teeth of the first high gear 56 is higher than the number of teeth of the first middle gear 54. More specifically, the first middle gear 54, the first low gear 55, and the first high gear 56 are integrally formed with the fourth shaft 39. However, the first middle gear 54, the first low gear 55, and the first high gear 56 may be separate from the fourth shaft 39.

The fifth shaft 51 extends along the second rotational axis Ax2 and is connected to the traveling devices (the front wheel 3A and the rear wheel 3B) of the work vehicle (tractor 1). More specifically, as shown in FIG. 7, the fifth shaft 51 is connected to the differential gear 3BDof the rear wheel 3BD. The fifth shaft 51 is connected to differential gear 3AD (see FIG. 1) on the front wheel 3A via a gear unit 70. The gear unit 70 includes a first front wheel drive gear 71 attached to an end of the fifth shaft 51, a second gear assembly 72 supported by the PTO shaft 7, a second front wheel drive gear 75, and a front wheel drive shaft 76. The first front wheel drive gear 71 is rotatable about the second rotational axis Ax2 together with the fifth shaft 51. The second gear assembly 72 is supported on the PTO shaft 7 via a needle bearing NB7 and is rotatable relative to the PTO shaft 7 about a third rotational axis Ax3. The second gear assembly 72 includes a fifth gear portion 73 engaged with the first front wheel drive gear 71 and a sixth gear portion 74 engaged with the second front wheel drive gear 75. Although the fifth gear portion 73 and the sixth gear portion 74 are integrally formed, they may be separate members. The second front wheel drive gear 75 is rotatable together with the front wheel drive shaft 76.

As shown in FIGS. 2 and 3, the fifth shaft 51 is spaced apart from the third shaft 29 along the second rotational axis Ax2. The fifth shaft 51 includes a first male spline 51S, a first support portion 52, and a second support portion 53. The first male spline 51S is a male spline extending along the second rotational axis Ax2. The first support portion 52 is provided adjacent to one end of the first male spline 51S along the second rotational axis Ax2, and rotatably supports the first free gear 57. The second support portion 53 is provided adjacent to the other end of the first male spline 51S opposite to the one end of the first male spline 51S along the second rotational axis Ax2, and rotatably supports the second free gear 60.

The first free gear 57 is supported by the fifth shaft 51 so as to be rotatable relative to the fifth shaft 51 about the second rotational axis Ax2. The first free gear 57 engages with one gear out of the first low gear 55, the first middle gear 54, and the first high gear 56. Specifically, the first free gear 57 engages with the first low gear 55. The first free gear 57 has a first inner peripheral surface 57IS, a first gear portion 58, and a second male spline 59. Although the first inner peripheral surface 57IS, the first gear portion 58, and the second male spline 59 are integrally formed, they may not be integrally formed as long as they are coupled to each other. The first inner peripheral surface 57IS faces the first support portion 52. To be specific, the first inner peripheral surface 57IS is connected to the first support portion 52 via the needle bearing NB8. The first gear portion 58 engages with the first low gear 55 opposite to the first inner peripheral surface 57IS in the radial direction with respect to the second rotational axis Ax2. The first gear portion 58 may be engaged with the first middle gear 54 or the first high gear 56. The second male spline 59 is a male spline having substantially the same shape as the first male spline 51S opposite to the first inner peripheral surface 57IS. The second male spline 59 is closer to the one end of the first male spline 51S than the first gear portion 58 in the direction along the second rotational axis Ax2.

The second free gear 60 is supported by the fifth shaft 51 so as to be rotatable relative to the fifth shaft 51 about the second rotational axis Ax2. The second free gear 60 engages with another gear out of the first low gear 55, the first middle gear 54, and the first high gear 56 other than the one gear that is engaged with the first free gear 57. Specifically, the second free gear 60 engages with the first high gear 56. The second free gear 60 has a second inner peripheral surface 60IS, a second gear portion 61, and a third male spline 62. Although the second inner peripheral surface 60IS, the second gear portion 61, and the third male spline 62 are integrally formed, they may not be integrally formed as long as they are coupled to each other. The second inner peripheral surface 60IS faces the second support portion 53. To be specific, the second inner peripheral surface 60IS is connected to the first support portion 52 via the needle bearing NB9. The second gear portion 61 is engaged with the another gear opposite to the second inner peripheral surface 60IS in the radial direction. The third male spline 62 is a male spline having substantially the same shape as the first male spline 51S opposite to the second inner peripheral surface 60IS. The third male spline 62 is closer to the other end of the first male spline 51S than the second gear portion 61 in the direction along the second rotational axis Ax2.

The sliding gear 63 is supported by the fifth shaft 51 so as to be rotatable together with the fifth shaft 51 about the second rotational axis Ax2. The sliding gear 63 is slidable on the fifth shaft 51 along the second rotational axis Ax2. In particular, the sliding gear 63 is moved by the shift fork 66 in a direction along the second rotational axis Ax2. The sliding gear 63 has a female spline 64 and a third gear portion 65. The female spline 64 faces the fifth shaft 51 and is engageable with the first male spline 51S, the second male spline 59, and the third male spline 62. The third gear portion 65 is provided opposite to the female spline 64 in the radial direction, and is engageable with the remaining gears of the first low gear 55, the first middle gear 54, and the first high gear 56 other than the one gear engaged with the first free gear 57 and the another gear engaged with the second free gear 60.

Specifically, the sliding gear 63 can engage with the first middle gear 54. When the third gear portion 65 engages with the remaining gear (the first middle gear 54), the female spline 64 is engaged with only the first male spline 51S. At this time, the rotation of the fourth shaft 39 is transmitted to the fifth shaft 51 via the remaining gears, the third gear portion 65, the female spline 64, and the first male spline 51S. When the female spline 64 is engaged with both the first male spline 51S and the second male spline 59, the third gear portion 65 does not engage with the remaining gear (the first middle gear 54). At this time, the rotation of the fourth shaft 39 is transmitted to the fifth shaft 51 via the one gear, the first gear portion 58, the second male spline 59, the female spline 64, and the first male spline 51S. When the female spline 64 is engaged with both the first male spline 51S and the third male spline 62, the third gear portion 65 does not engage with the remaining gear (the first middle gear 54). At this time, the rotation of the fourth shaft 39 is transmitted to the fifth shaft 51 via the other one gear, the second gear portion 61, the third male spline 62, the female spline 64, and the first male spline 51S.

An outer frame of the transmission case 5T is sealed so that lubricating oil can be stored therein. To be more specific, the front case portion 5A shown in FIG. 2 has a partition wall 5TW and a cover portion 5TC, and a first seal S1 is provided so that the lubricating oil does not flow out from a through-hole 5TH of the cover portion 5TC through which the input shaft 11 penetrates. In addition, a second seal S2 is provided so that the lubricating oil does not flow out from a through-hole 7TH of the rear case portion 5C through which the PTO shaft 7 shown in FIG. 7 penetrates. A space surrounded by the partition wall 5TW, the cover portion 5TC, the first seal S1, the outer shell of the front case portion 5A, the outer shell of the intermediate case portion 5B, the outer shell of the rear case portion 5C, and the second seal S2 is sealed. Therefore, the transmission case 5T includes the partition wall 5TW, the cover portion 5TC, the first seal S1, the outer contour of the front case portion 5A, the outer contour of the intermediate case portion 5B, the outer contour of the rear case portion 5C, and the second seal S2, and can store the lubricating oil. The clutch 30 is a wet clutch, and lubricating oil is stored in the transmission case 5T so as to lubricate at least a part of the clutch 30.

<Peripheral Components of the Engine 4>

Figure 8:
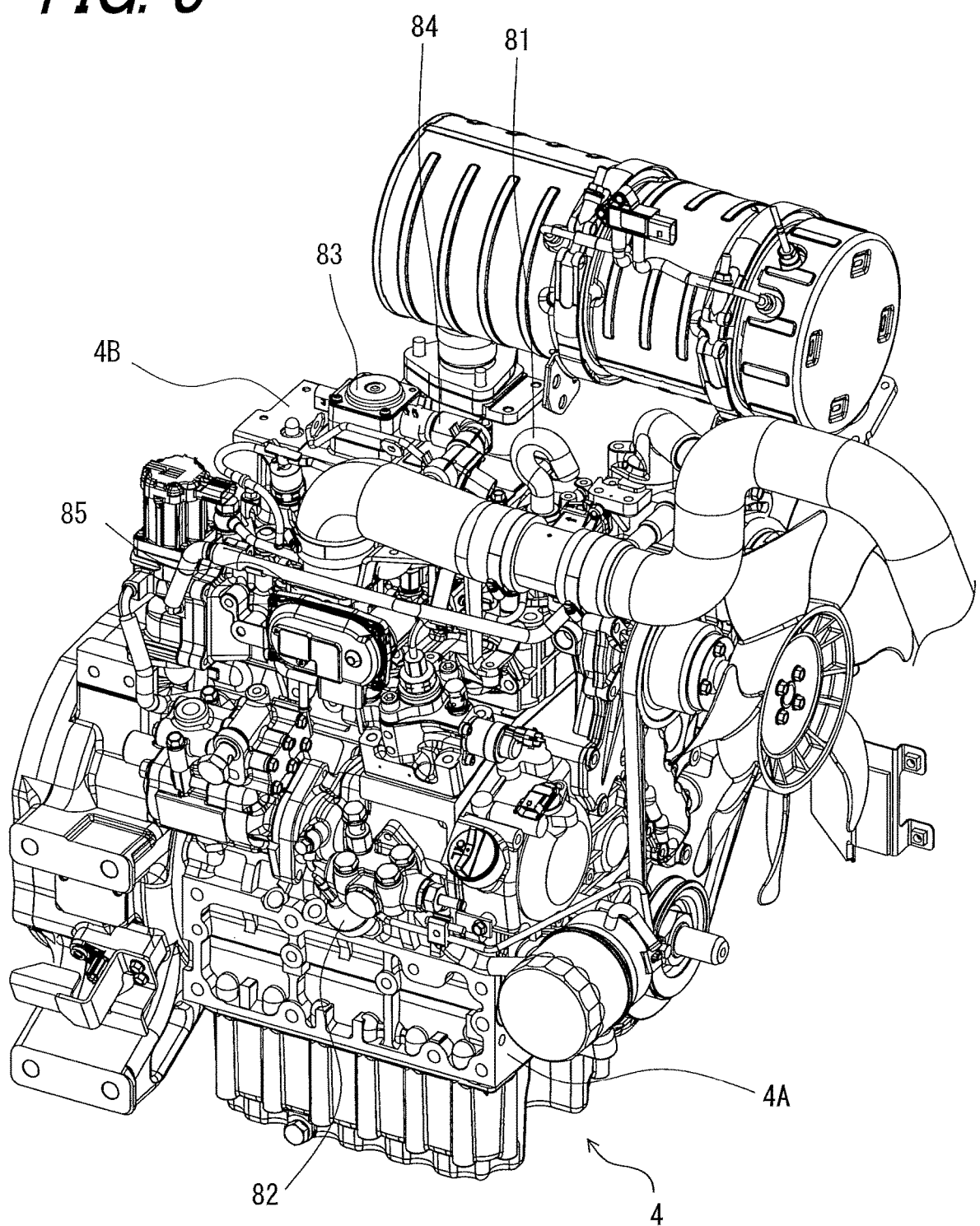
FIG. 8 is a perspective view of the periphery of the engine.
Figure 9:
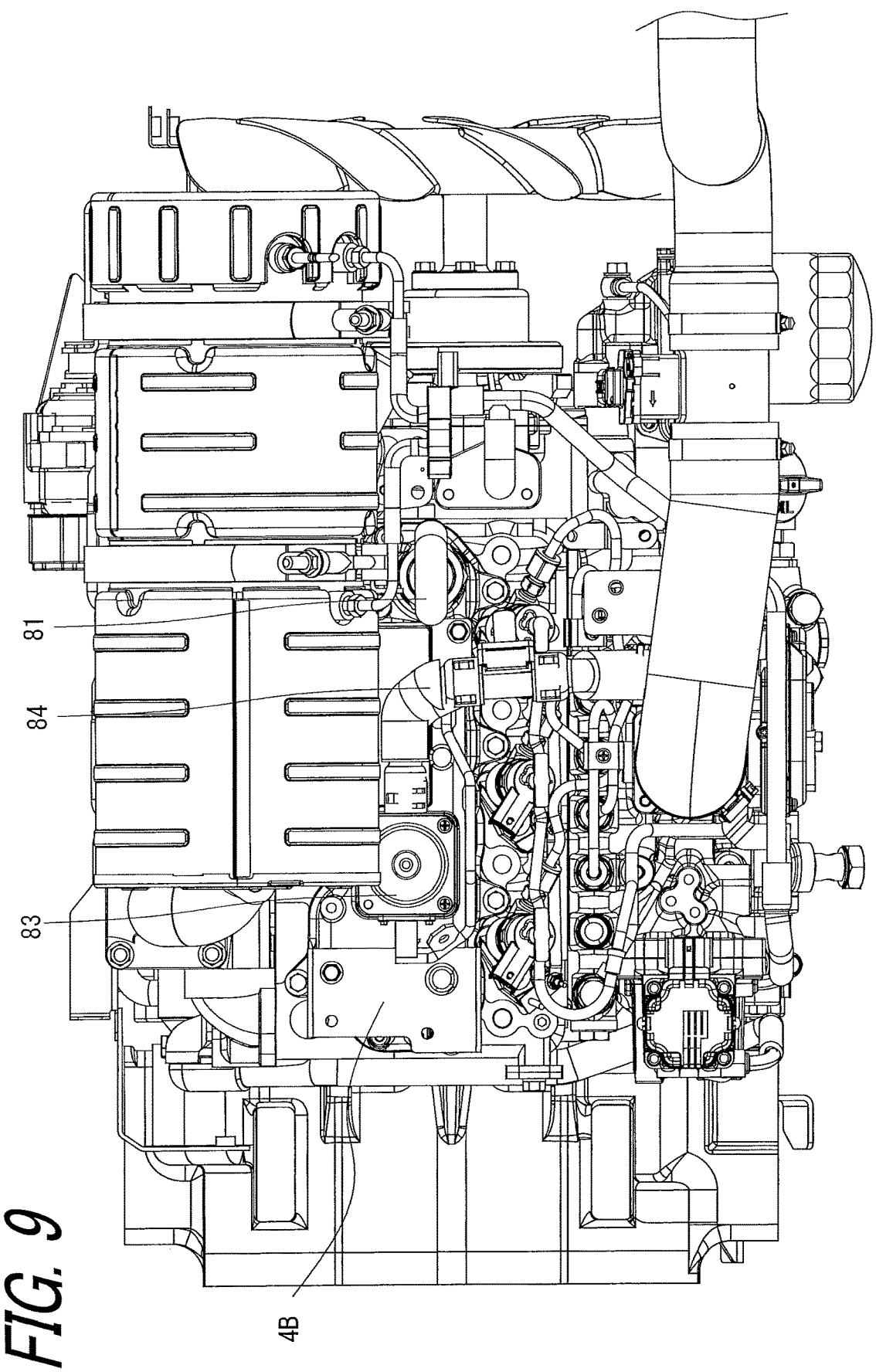
FIG. 9 is a left side view of the periphery of the engine.
Figure 10:
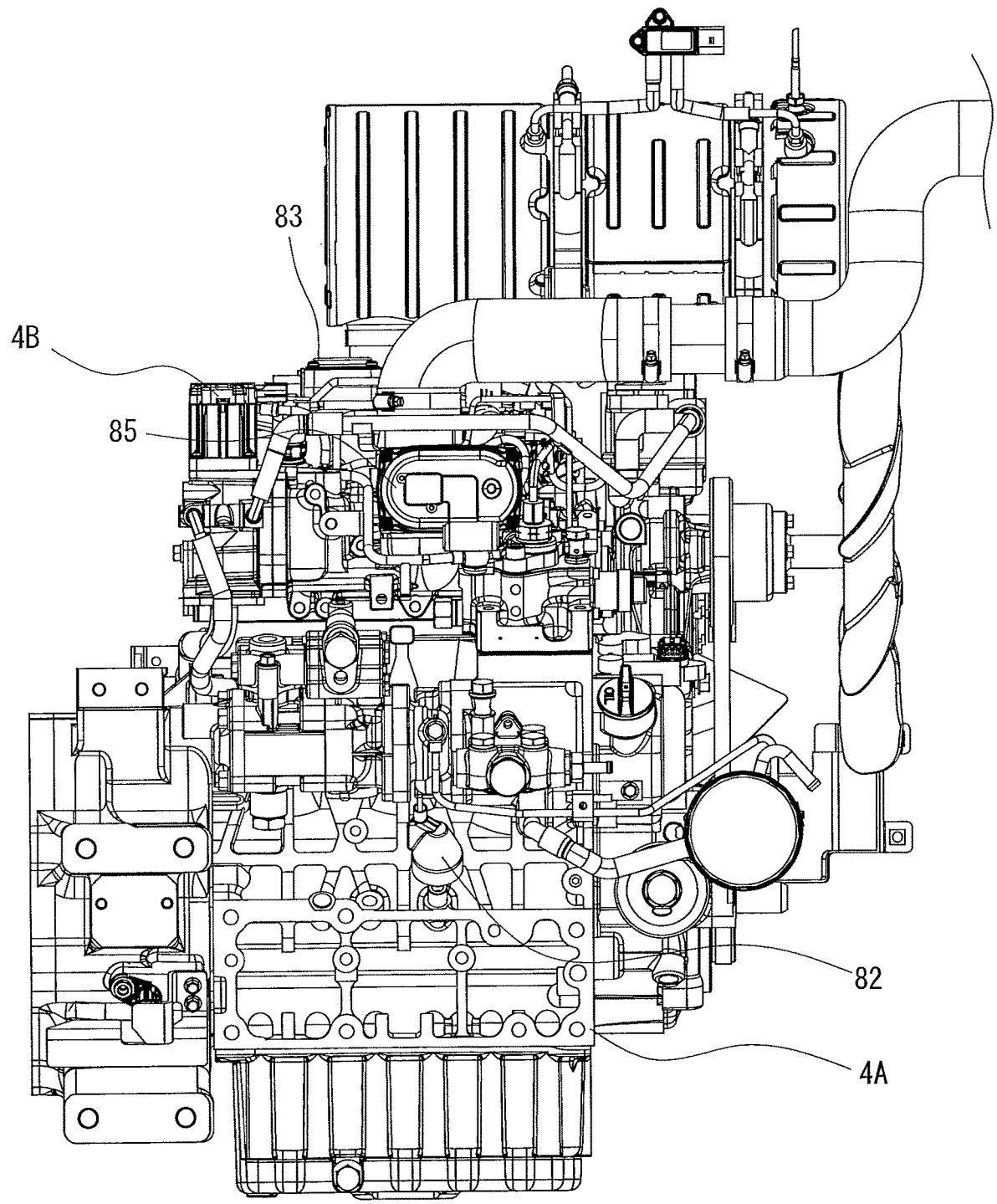
FIG. 10 is a top view of the periphery of the engine.
Figure 11:
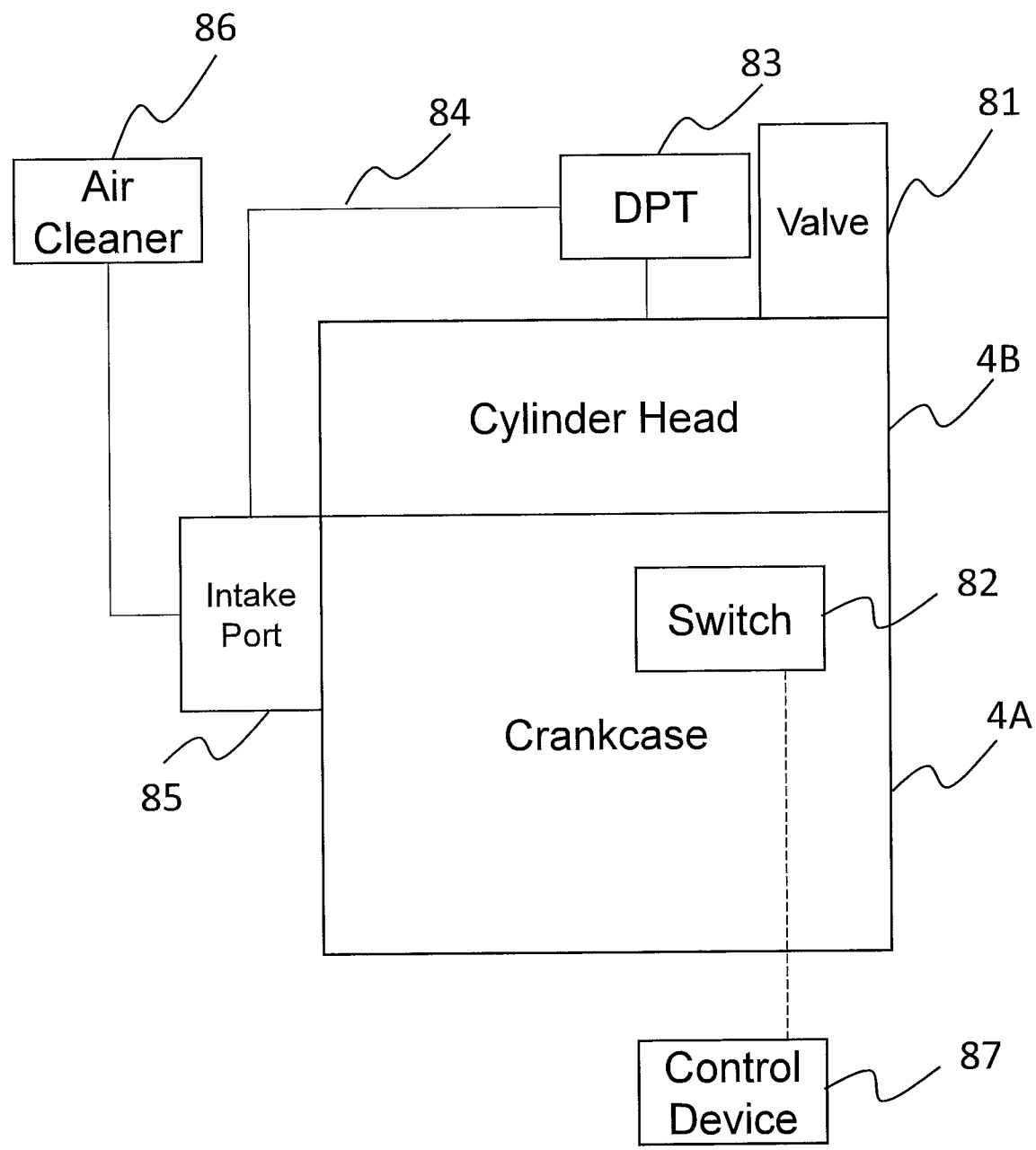
FIG. 11 is a schematic view of components connected to an engine.

FIG. 8 is a perspective view of the periphery of the engine 4. FIG. 9 is a left side view of the periphery of the engine 4. FIG. 10 is a top view of the periphery of the engine 4. FIG. 11 is a schematic view of components connected to the engine 4. Referring to FIGS. 8 to 11, a diesel particulate trap (DPT) 83 is connected to the cylinder head 4B of the engine 4, and the exhaust gas of the engine 4 purified thereby is sent to an intake port 85 via an air supply pipe 84. Air sent from an air cleaner 86 is also sent to the intake port 85 and sent to the crankcase 4A of the engine 4. A heater is attached to the air supply pipe 84, and the air supply pipe 84 is configured so that the inside of the air supply pipe 84 is not blocked by freezing. However, if the air supply pipe 84 is blocked due to a failure of the heater or the like, the internal pressure of the engine 4 increases. The valve 81 is configured to discharge gas inside the engine 4 in order to reduce the internal pressure of the engine 4 when the internal pressure in the 4B of the cylinder head becomes equal to or higher than a predetermined pressure.

Further, a switch 82 is attached to a side surface (side with respect to the axial direction of the crankshaft) of the crankcase 4A of the engine 4. The switch 82 is configured to send a signal to the control device 87 of the tractor 1 when the internal pressure of the crankcase 4A exceeds a predetermined pressure. When the signal is sent to the control device 87, the control device 87 is configured to cause the control panel of the tractor 1 to display an alarm.

Effects and Advantages According to the Embodiment

The power transmission device 10 according to the present embodiment includes a first rotation transmission mechanism 22 provided with a clutch 30 below a first shaft 21 rotated by an engine 4 and a second shaft 28 connected to a PTO shaft 7 and transmitting power of the first shaft 21 to the clutch 30, and a second rotation transmission mechanism 25 for transmitting power applied to the clutch 30 to the second shaft 28. This facilitates lubrication of the clutch 30.

In this application, "comprising" and its derivatives are open ended terms that describe the presence of a component and do not preclude the presence of other components not described. This also applies to the words "comprise", "comprise" and derivatives thereof.

The terms "member", "portion", "element", "body", and "structure" may have a plurality of meanings such as a single portion or a plurality of portions.

Ordinal numbers such as "first" and "second" are merely terms for identifying components, and do not have other meanings (e.g., a specific order). For example, the presence of "a first element" does not imply the presence of "a second element", and the presence of "a second element" does not imply the presence of "a first element".

Terms such as "substantially," "about," and "approximately" representing a degree can mean a reasonable amount of deviation such that the final result is not significantly altered, unless specifically stated in an embodiment. All numerical values described herein may be interpreted to include words such as "substantially," "about," and "approximately."

The phrase "at least one of A and B" as used herein should be interpreted to include only A, only B, and both A and B.

Obviously, many modifications and variations of the present invention are possible in light of the above teachings. Therefore, the present invention may be practiced otherwise than as specifically disclosed herein without departing from the spirit of the present invention.

What is claimed is:

1. A power transmission device comprising:
   a first shaft provided to be rotatable about a first rotational axis and connected to a hydraulic pump to be driven by an engine;
   a second shaft provided to be rotatable about the first rotational axis to rotate a power takeoff shaft;
   a clutch including a first rotating portion and a second rotating portion which are arranged to face each other in a second rotational axis and which are provided to be rotatable about the second rotational axis that is substantially parallel to the first rotational axis and vertically below the first rotational axis, the first rotating portion being connectable to and separable from the second rotating portion;
   a first rotation transmission mechanism configured to transmit rotation of the first shaft to the first rotating portion; and
   a second rotation transmission mechanism configured to transmit rotation of the second rotating portion to the second shaft.

2. The power transmission device according to claim 1, further comprising a transmission case accommodating the first shaft, the second shaft, the clutch, the first rotation transmission mechanism, and the second rotation transmission mechanism, the transmission case being configured to store lubricating oil.

3. The power transmission device according to claim 2, wherein the clutch is a hydraulic clutch.

4. The power transmission device according to claim 3, further comprising a third shaft extending along the second rotational axis,
wherein the clutch is rotatably supported by the third shaft,
wherein the clutch includes a cylinder and a piston that define an oil chamber,
wherein the third shaft includes a first oil passage extending along the second rotational axis, and
wherein hydraulic oil is suppliable to the oil chamber via the first oil passage.

5. The power transmission device according to claim 4, wherein the transmission case includes a support member that rotatably supports the third shaft, the support member including a second oil passage connectable to the first oil passage, the hydraulic oil being suppliable to the oil chamber via the first oil passage and the second oil passage.

6. The power transmission device according to claim 5, further comprising:
the hydraulic pump configured to be rotated about the first rotational axis by the first shaft;
a hydraulic motor to be driven by the hydraulic pump;
a fourth shaft configured to be rotated by the hydraulic motor;
a first middle gear provided on the fourth shaft to be rotatable together with the fourth shaft;
a first low gear provided on the fourth shaft to be rotatable together with the fourth shaft, a number of teeth of the first low gear being smaller than a number of teeth of the first middle gear;
a first high gear provided on the fourth shaft to be rotatable together with the fourth shaft, a number of teeth of the first high gear being higher than the number of teeth of the first middle gear;
a fifth shaft connected to a traveling device of a work vehicle, the fifth shaft extending along the second rotational axis to be rotatable about the second rotational axis;
a first free gear supported by the fifth shaft so as to be rotatable with respect to the fifth shaft about the second rotational axis, the first free gear engaging with one gear out of the first low gear, the first middle gear, and the first high gear;
a second free gear supported by the fifth shaft so as to be rotatable with respect to the fifth shaft about the second rotational axis, the second free gear engaging with another gear out of the first low gear, the first middle gear, and the first high gear other than the one gear that is engaged with the first free gear; and
a sliding gear supported by the fifth shaft so as to be rotatable together with the fifth shaft about the second rotational axis, the sliding gear being slidable on the fifth shaft along the second rotational axis,
wherein the fifth shaft includes
a first male spline extending along the second rotational axis,
a first support portion provided adjacent to one end of the first male spline along the second rotational axis and rotatably supporting the first free gear, and
a second support portion provided adjacent to the other end of the first male spline opposite to the one end of the first male spline along the second rotational axis and rotatably supporting the second free gear,
wherein the first free gear includes
a first inner peripheral surface rotatably supported by the first support portion,
a first gear portion engaging with the one gear opposite to the first inner peripheral surface in a radial direction with respect to the second rotational axis, and
a second male spline having substantially the same shape as the first male spline opposite to the first inner peripheral surface in the radial direction and closer to the one end of the first male spline than the first gear portion in the direction along the second rotational axis,
wherein the second free gear includes
a second inner peripheral surface rotatably supported by the second support portion,
a second gear portion engaging with the another gear opposite to the second inner peripheral surface in the radial direction, and
a third male spline having substantially the same shape as the first male spline opposite to second inner peripheral surface in the radial direction and being closer to the other end of the first male spline than the second gear portion in the direction along the second rotational axis,
wherein the sliding gear includes
a female spline facing the fifth shaft to be engageable with the first male spline, the second male spline, and the third male spline, and
a third gear portion provided opposite to the female spline in the radial direction to be engageable with a remaining gear out of the first low gear, the first middle gear, and the first high gear which is other than the one gear engaged with the first free gear and the another gear engaged with the second free gear,
wherein, when the third gear portion engages with the remaining gear, the female spline is engaged with only the first male spline,
wherein, when the female spline engages with both the first male spline and the second male spline, the third gear portion does not engage with the remaining gear, and
wherein, when the female spline is engaged with both the first male spline and the third male spline, the third gear portion does not engage with the remaining gear.

7. The power transmission device according to claim 6, wherein the first free gear engages with the first low gear, the second free gear engages with the first high gear, and the sliding gear is engageable with the first middle gear.

8. The power transmission device according to claim 7, wherein the fifth shaft is spaced apart from the third shaft along the second rotational axis.

9. The power transmission device according to claim 8, wherein the fourth shaft and the power takeoff shaft are rotatable about a third rotational axis, and the fourth shaft is spaced apart from the power takeoff shaft along the third rotational axis.

10. The power transmission device according to claim 9, further comprising:
a first PTO drive gear provided on the second shaft to be rotatable together with the second shaft together with the first rotational axis;
a gear assembly supported by the fifth shaft so as to be rotatable about the second rotational axis relative to the fifth shaft and including:

a third gear portion that engages with the first PTO drive gear to be rotatable about the second rotational axis; and
a fourth gear portion that is rotatable about the second rotational axis together with the third gear portion; and
a second PTO drive gear engaging with the fourth gear portion and supported by the power takeoff shaft so as to be rotatable together with the power takeoff shaft.

11. The power transmission device according to claim 10, further comprising:
an input shaft provided below the first rotational axis and configured to rotate together with an output shaft of the engine; and
a third rotation transmission mechanism configured to transmit rotation of the input shaft to the first shaft.

12. The power transmission device according to claim 11, wherein no clutch is provided between the engine and the third rotation transmission mechanism.

13. The power transmission device according to claim 12, wherein the third rotation transmission mechanism includes a transmission input gear connected to the input shaft, and an engine connection gear is rotatable about a rotational axis that is below the first rotational axis and parallel to the first rotational axis.

14. The power transmission device according to claim 13, wherein the clutch is a wet clutch.

15. The power transmission device according to claim 4, further comprising:
the hydraulic pump configured to be rotated about the first rotational axis by the first shaft;
a hydraulic motor to be driven by the hydraulic pump;
a fourth shaft configured to be rotated by the hydraulic motor;
a first middle gear provided on the fourth shaft to be rotatable together with the fourth shaft;
a first low gear provided on the fourth shaft to be rotatable together with the fourth shaft, a number of teeth of the first low gear being smaller than a number of teeth of the first middle gear;
a first high gear provided on the fourth shaft to be rotatable together with the fourth shaft, a number of teeth of the first high gear being higher than the number of teeth of the first middle gear;
a fifth shaft connected to a traveling device of a work vehicle, the fifth shaft extending along the second rotational axis to be rotatable about the second rotational axis;
a first free gear supported by the fifth shaft so as to be rotatable with respect to the fifth shaft about the second rotational axis, the first free gear engaging with one gear out of the first low gear, the first middle gear, and the first high gear;
a second free gear supported by the fifth shaft so as to be rotatable with respect to the fifth shaft about the second rotational axis, the second free gear engaging with another gear out of the first low gear, the first middle gear, and the first high gear other than the one gear that is engaged with the first free gear; and
a sliding gear supported by the fifth shaft so as to be rotatable together with the fifth shaft about the second rotational axis, the sliding gear being slidable on the fifth shaft along the second rotational axis,
wherein the fifth shaft includes
a first male spline extending along the second rotational axis,
a first support portion provided adjacent to one end of the first male spline along the second rotational axis and rotatably supporting the first free gear, and
a second support portion provided adjacent to the other end of the first male spline opposite to the one end of the first male spline along the second rotational axis and rotatably supporting the second free gear,
wherein the first free gear includes
a first inner peripheral surface rotatably supported by the first support portion,
a first gear portion engaging with the one gear opposite to the first inner peripheral surface in a radial direction with respect to the second rotational axis, and
a second male spline having substantially the same shape as the first male spline opposite to the first inner peripheral surface in the radial direction and closer to the one end of the first male spline than the first gear portion in the direction along the second rotational axis,
wherein the second free gear includes
a second inner peripheral surface rotatably supported by the second support portion,
a second gear portion engaging with the another gear opposite to the second inner peripheral surface in the radial direction, and
a third male spline having substantially the same shape as the first male spline opposite to second inner peripheral surface in the radial direction and being closer to the other end of the first male spline than the second gear portion in the direction along the second rotational axis,
wherein the sliding gear includes
a female spline facing the fifth shaft to be engageable with the first male spline, the second male spline, and the third male spline, and
a third gear portion provided opposite to the female spline in the radial direction to be engageable with a remaining gear out of the first low gear, the first middle gear, and the first high gear which is other than the one gear engaged with the first free gear and the another gear engaged with the second free gear,
wherein, when the third gear portion engages with the remaining gear, the female spline is engaged with only the first male spline,
wherein, when the female spline engages with both the first male spline and the second male spline, the third gear portion does not engage with the remaining gear, and
wherein, when the female spline is engaged with both the first male spline and the third male spline, the third gear portion does not engage with the remaining gear.

16. The power transmission device according to claim 15, wherein the first free gear engages with the first low gear, the second free gear engages with the first high gear, and the sliding gear is engageable with the first middle gear.

17. The power transmission device according to claim 16, wherein the fifth shaft is spaced apart from the third shaft along the second rotational axis.

18. The power transmission device according to claim 16, wherein the fourth shaft and the power takeoff shaft are rotatable about a third rotational axis, and the fourth shaft is spaced apart from the power takeoff shaft along the third rotational axis.

19. The power transmission device according to claim 15, wherein the fifth shaft is spaced apart from the third shaft along the second rotational axis.

20. The power transmission device according to claim 15, wherein the fourth shaft and the power takeoff shaft are rotatable about a third rotational axis, and the fourth shaft is spaced apart from the power takeoff shaft along the third rotational axis.

\* \* \* \* \*